United States Patent [19]
Gallagher et al.

[11] Patent Number: 5,799,084
[45] Date of Patent: Aug. 25, 1998

[54] SYSTEM AND METHOD FOR AUTHENTICATING CELLULAR TELEPHONIC COMMUNICATION

[75] Inventors: Michael D. Gallagher, San Jose; Kirk D. Carlson, Santa Clara; Stuart S. Jeffery; Ming J. Lee, both of Los Altos; Vilnis G. Grencions; Randall A. Snyder, both of Santa Clara, all of Calif.

[73] Assignee: Synacom Technology, Inc., San Jose, Calif.

[21] Appl. No.: 642,215

[22] Filed: May 6, 1996

[51] Int. Cl.$^6$ .................... H04L 9/00; H04L 9/32
[52] U.S. Cl. .................... 380/23; 380/21; 380/25; 380/49
[58] Field of Search .................... 380/23, 25, 49, 380/50, 59, 21, 29, 30, 46; 340/825.31, 825.34

[56] References Cited

U.S. PATENT DOCUMENTS

| | | | |
|---|---|---|---|
| 5,153,919 | 10/1992 | Reeds, III et al. | 380/23 X |
| 5,204,902 | 4/1993 | Reeds, III et al. | 380/23 |
| 5,237,612 | 8/1993 | Raith | 380/23 |
| 5,335,278 | 8/1994 | Matchett et al. | 380/23 |
| 5,455,863 | 10/1995 | Brown et al. | 380/23 |
| 5,513,245 | 4/1996 | Mizikovsky et al. | 380/49 X |

Primary Examiner—Bernarr E. Gregory
Attorney, Agent, or Firm—Fenwick & West LLP

[57] ABSTRACT

A system and method for authenticating a mobile station (MS) in a cellular network. The present invention is an authentication technique that uses the AMPS standard, or a derivative thereof, can authenticate a MS automatically, does not require modifications to the BS, MSC, or VLR, can detect mobile identification number/electronic serial number (MIN/ESN) clones, detects MIN/ESN clones that re-transmit the authentication results of the present invention, and can be easily and inexpensively added to MSs 102 that are based on the AMPS standard (and derivatives thereof). The present invention uses the AMPS-based MSs to automatically execute special authentication procedures using standard MS-to-BS and BS-to-MS messages. The present invention also uses a corresponding network authentication function that can be implemented in either (a) a modified HLR/AC, or (b) a new network component that has access to the signaling information between the HLR and the MSC/VLR.

16 Claims, 9 Drawing Sheets

SYSTEM AND METHOD FOR AUTHENTICATING CELLULAR TELEPHONIC COMMUNICATION

BACKGROUND OF THE INVENTION

1. Field of the Invention

The present invention relates generally to the field of signal authentication and more particularly to the field of signal authentication in a telephone system.

2. Description of Background Art

Figure 1:
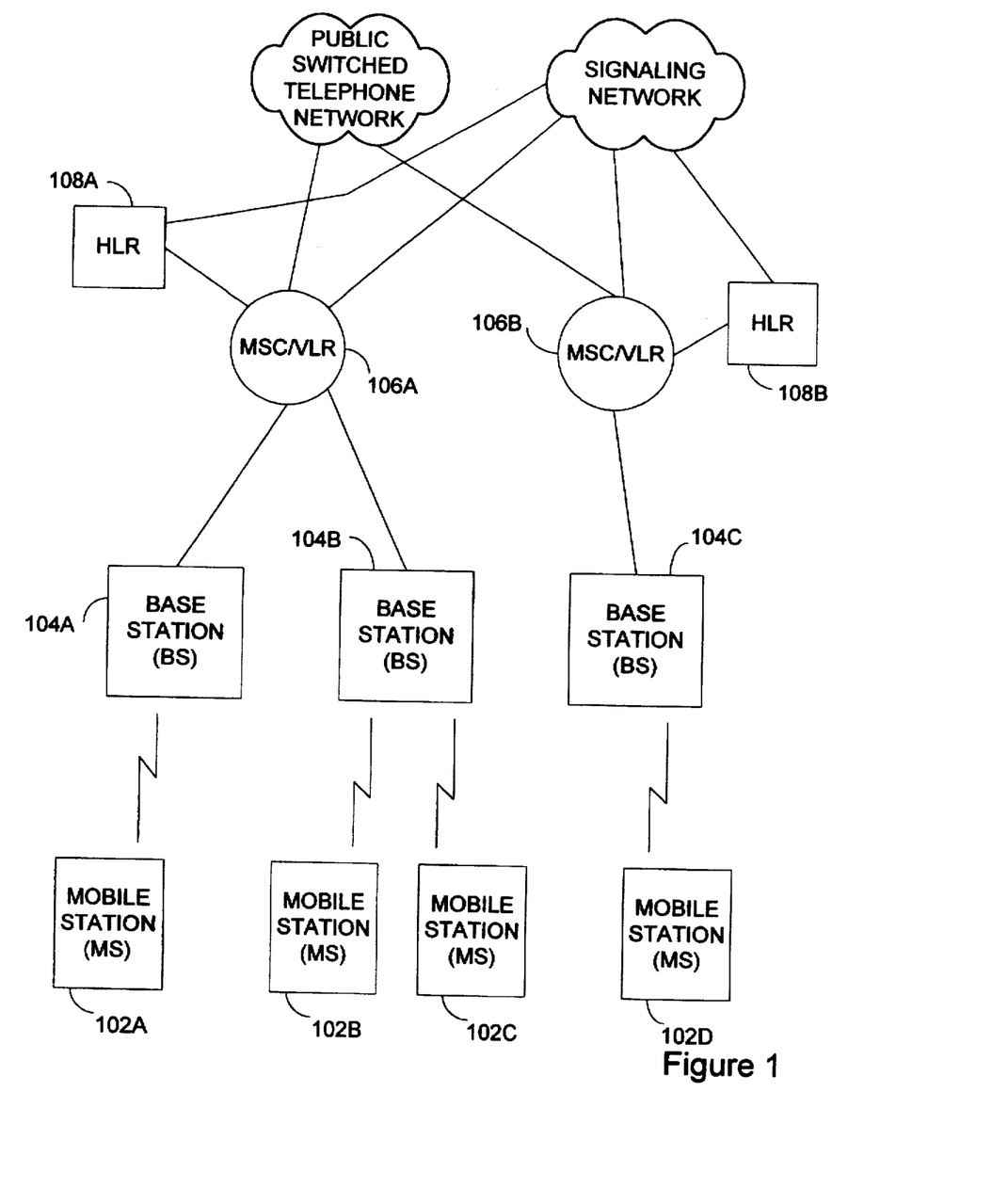
FIG. 1 is an illustration of one example of a cellular network topology.

The last decade has seen a explosion in the use of cellular telephones. Cellular telephones operate on a cellular telephone network that includes, for example, mobile stations (MSs), base stations (BSs), mobile switching centers (MSCs), visitor location registers (VLRs), and home location registers (HLRs). FIG. 1 is an illustration of one example of a cellular network topology. In a conventional cellular network, a user operates a MS, e.g., a mobile telephone, model number DPC550 manufactured by Motorola Corporation. The user turns on the MS 102C and the MS 102C transmits an electromagnetic signal representing a unique MS identifier to a BS 104B through the air. The BS 104B is typically a tower having an antenna and includes an transceiver and is located close to the MS 102C. Currently, there are thousands of BSs 104 in the United States. Some of the functions performed by the BS 104B include converting the received electromagnetic signal into an electrical signal, assigning a voice channel to the MS 102C, and paging a MS 102C. The BS 104B transmits a signal representing the unique MS identifier to a MSC 106A on a signaling channel. Currently, there are hundreds of MSCs in the United States. Frequently, each MSC 106 and its associated BSs 104 are provided by a single manufacturer, e.g., Motorola Corp. Accordingly, a proprietary interface protocol is typically used to communicate between the BSs 104 and the MSC 106.

The MSC 106A identifies the home system of the MS 102C and transmits a signal to the home system to register the MS 102C. The home system includes a HLR having a profile of the subscriber (registered user) of the MS 102C. A profile includes a copy of the unique MS identifier and indications of the type of services available to the subscriber. One purpose of registering the MS with the home system is to enable the MSC to charge the home system and for the home system to charge the owner of the MS 104 for the cost of the call on the cellular network. If the unique MS identifier matches a stored identifier in the home system then the home system transmits a registration signal to the MSC 106A and the user of the MS 102C is then permitted to use the cellular network. Currently, a standard signaling protocol, e.g., Telecommunications Industry Association (TIA) IS-41, is used for communication between a MSC/VLR 106 and a HLR 108. The IS-41 signaling protocol is described in greater detail in TIA/EIA, Interim Standard IS-41-C, Cellular Radio-Telecommunications Intersystem operations, February 1996 that is incorporated by reference herein in its entirety.

A significant problem with the current cellular network is fraud. Specifically, the signal between the MS and the BS can be intercepted by an unauthorized source. The unauthorized source can determine the unique MS identifier included in the intercepted signal and can then program a fraudulent MS to transmit the intercepted MS identifier. As a result, the unauthorized source utilizes the cellular network and the cost of this use is charged to the subscriber whose MS identifier was intercepted. Some estimates of the monetary losses from this type of fraud range from $2 million to $3 million per day, as of 1996.

In order to solve this fraud, the TIA has developed authentication standards that are designed to eliminate this "cloning" problem, i.e., simulating legitimate MS 102C using the intercepted identification information sent over the air. The TIA authentication standards for network equipment, e.g., MSC, VLR, HLR and AC, are TSB51, that are described in TIA/EIA, Telecommunications System Bulletin - TSB51, Cellular Radiotelecommunications: Authentication, Signaling Message Encryption and Voice Privacy, May 1993, that is incorporated by reference herein in its entirety, and the TIA IS-41-C. The TIA air interface standards are: IS-54-B that is described in TIA/EIA, Interim Standard IS-54-B, Cellular System Dual-Mode Mobile Station—Base Station Compatibility Standard, April 1992; IS-88, described in TIA/EIA, Interim Standard IS-88, Mobile Station—Land Station Compatibility Standard for Dual-Mode Narrowband Analog Cellular Technology, Jan., 1993; IS-91, described in TIA/EIA Interim Standard IS-91, Mobile Station—Base Station Compatibility Standard for 800 MHz Analog Cellular, October, 1994; IS-95-A, described in TIA/EIA, Interim Standard IS-95-A, Mobile Station—Base Station Compatibility Standard for Dual-Mode Wideband Spread Spectrum Cellular Systems, May, 1995; and IS-136, described in TIA/EIA, Interim Standard IS-136, 800 MHz TDMA Cellular—Radio Interface—Mobile Station—Base Station Compatibility, December, 1994, that are all incorporated by reference herein in their entirety. However, a problem with the TIA standards is that in order to be supported and properly implemented, many components of the cellular network must be modified, including the MSs 102, BSs 104, MSC/VLRs 106, and HLRs 108, and a new component must be added, the Authentication Center (AC). The AC may be a separate piece of network equipment, but is frequently integrated with the HLR; this combination is identified as an HLR/AC. However, the cost of upgrading the existing BSs 104 and MSCs 106 is expensive. In addition, a vast majority of the MSs 102 used in North America are based upon the analog Advanced Mobile Phone System (AMPS) standard that does include any authentication procedures.

What is needed is a system and method for providing an authentication technique that: (1) uses the AMPS standard, or a derivative thereof (e.g., IS-88, IS-92, or IS-54-B, for example); (2) can authenticate a MS automatically; (3) does not require modifications to the BS, MSC, or VLR; (4) can detect mobile identification number/electronic serial number (MIN/ESN) clones; (5) detects MIN/ESN clones that re-transmit the authentication results of the present invention; and (6) can be easily and inexpensively added to MSs 102 that are based on the AMPS standard (and derivative thereof).

SUMMARY OF THE INVENTION

The invention is a system and method for authenticating a mobile station (MS) in a cellular network. The present invention is an authentication technique that uses the AMPS standard, or a derivative thereof (e.g., IS-88, IS-92, or IS-54-B, for example), can authenticate a MS automatically, does not require modifications to the BS, MSC, or VLR, can detect mobile identification number/electronic serial number (MIN/ESN) clones, detects MIN/ESN clones that re-transmit the authentication results of the present invention, and can be easily and inexpensively added to MSs 102 that are based on the AMPS standard (and derivative thereof).

The present invention requires the AMPS-based MSs to automatically execute special authentication procedures using standard MS-to-BS and BS-to-MS messages. The present invention also requires a corresponding network authentication function that can be implemented in either (a) a modified HLR/AC, or (b) a new network component that has access to the signaling information between the HLR and the MSC/VLR. The present invention is described in terms of a modified HLR/AC. Each MS is identified with a home system having an HLR/AC. The MS and the HLR/AC include unique identifiers associated with the MS. In addition, the MS and the HLR/AC each maintain a counter. When authenticating a signal received from a MS, the present invention, utilizes the existing signaling protocols for communication between the BSs, the MSC/VLRs, and the HLRs. The MS generates a signal having an encrypted value based upon a conventional encryption algorithm. In addition, a signal representing the count value, or a derivation of the count value, is also transmitted to the HLR/AC using a conventional protocol. However, for each MS authentication request the count value changes and causes the value of the encrypted signal to change. The HLR/AC has an authentication unit that ensures that a count value is incremented in the HLR/AC every time an authentication request is received. If the value of the received count signal is less than the count value in the HLR/AC the present invention determines that a previously used authentication signal has been re-transmitted and denies authorization to the MS. In addition, the HLR/AC independently calculates a signal having an encrypted value using the same encryption algorithm used by the MS. If the encrypted values match, and if the received counter value is valid, the HLR/AC identifies the MS as authentic and gives authorization to the MS. The present invention utilizes the authentication technique during registration and call origination to minimize the opportunity for cloning.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

In the preferred embodiment each MS 102 and each HLR 108 are modified to enable the method and system of the present invention to operate. In the preferred embodiment of the present invention, the elements are stored in a permanent storage module in the MS 102. In an alternate embodiment, the elements are added to the MS 102 by a removable card.

The present invention reduces fraud by having the MS 102 modify a predefined counter in a specific manner to generate a different encrypted signal for each authentication signal. The HLR/AC that keeps track of the value of the predefined counter to ensure that a clone cannot intercept and re-transmit authentication results at a later time because the HLR/AC will determine that the counter signal has already been used in a previous authentication signal.

Figure 2:
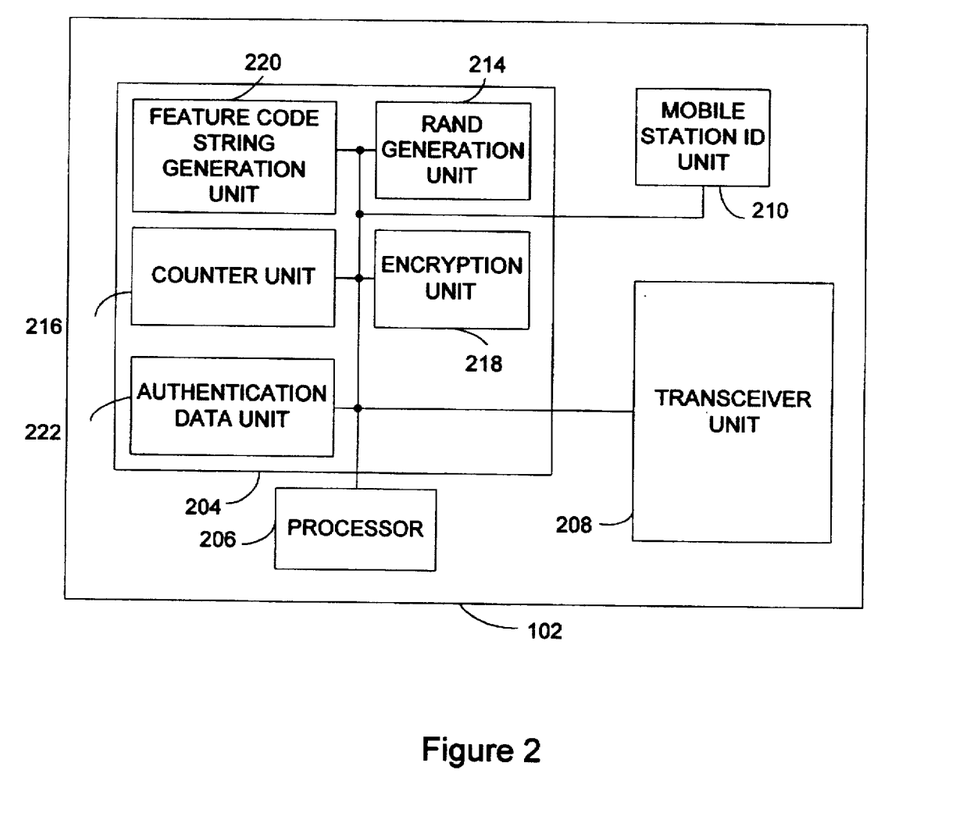
FIG. 2 is an illustration of a mobile station according to the preferred embodiment of the present invention.

FIG. 2 is an illustration of a mobile station 102 according to the preferred embodiment of the present invention. The MS 102 includes a transceiver unit 208, a processor 206, a mobile station identification unit 210, and a storage module 204. The storage module includes a RAND generation unit 214, a counter unit 216, an encryption unit 218, a feature code string generation unit 220, and an authentication data unit 222. The functions performed by each of these MS elements is described below.

Figure 3:
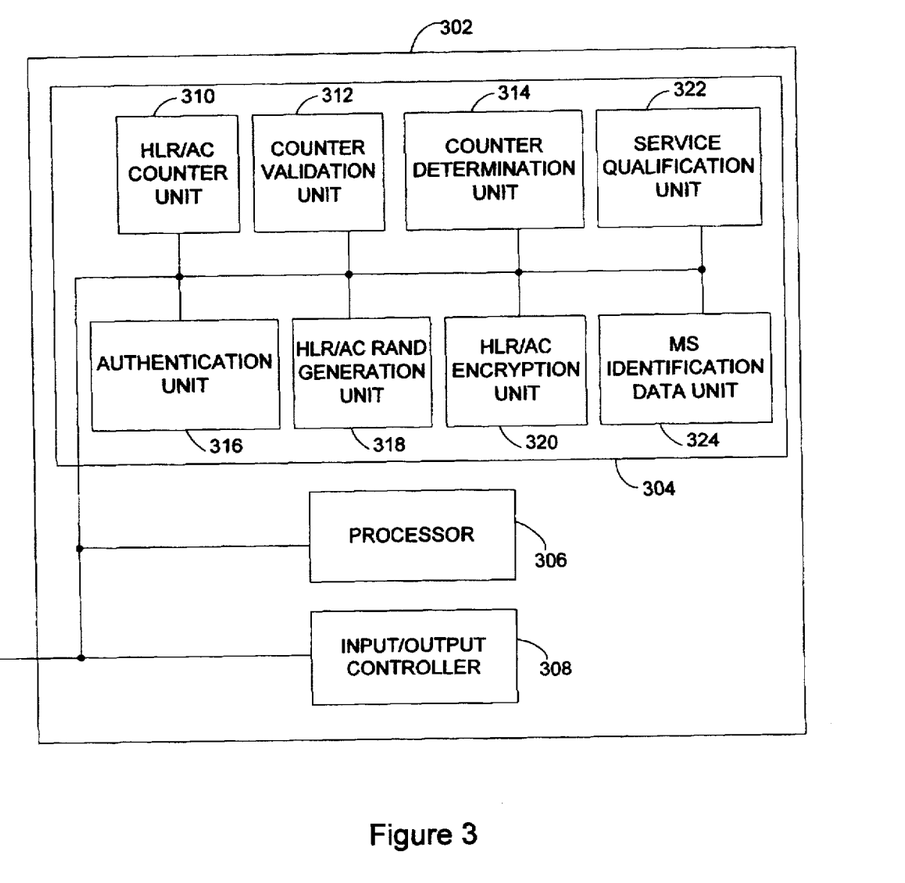
FIG. 3 is an illustration of an HLR/AC unit, according to the preferred embodiment of the present invention.

FIG. 3 is an illustration of a HLR unit 108 that includes an AC unit, together referred to as an HLR/AC unit 302, according to the preferred embodiment of the present invention. The HLR/AC unit 302 includes a storage unit 304, a processor 306, and an input/output (I/O) controller 308. The I/O controller is a conventional controller that controls signals transmitted and received by the HLR/AC 302. The processor is a conventional processor, for example, a Pentium processor, commercially available from Intel Corporation, Santa Clara, CA. The storage unit 304 includes a HLR/AC counter unit 310, a counter validation unit 312, a counter determination unit 314, an authentication unit 316, a HLR/AC RAND generation unit 318, a HLR/AC encryption unit 320, a service qualification unit 322, and a MS identification data unit 324. The functions performed by each of these HLR/AC elements is described below.

Figure 4:
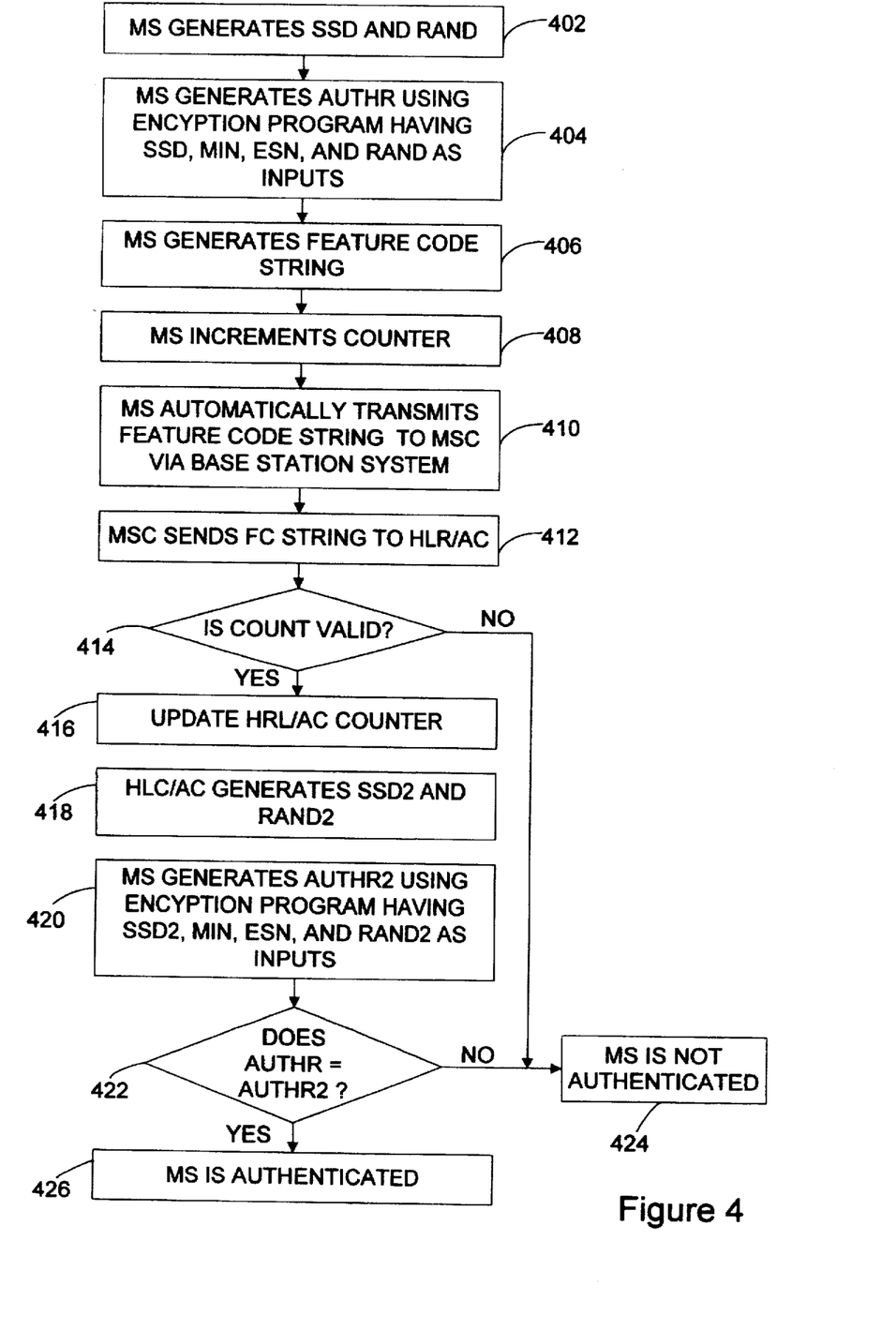
FIG. 4 is a flow chart of an authentication process according to the present invention.

FIG. 4 is a flow chart of an authentication process according to the present invention. The present invention can be implemented using a variety of techniques. It will be apparent to persons skilled in the relevant art that various changes in the implementation details of the authentication technique can be made without departing from the scope of the present invention. FIG. 4 illustrates the authentication process for MSs 102 served by IS-41 based systems using the TIA standard Cellular Authentication and Voice Encryption (CAVE) algorithm that is described in TIA, TR45.0.A, Common Cryptographic Algorithms, Revision B, May 9, 1995, which is incorporated by reference herein in its entirety. In the preferred embodiment, the MS 302 is authenticated when registering in a new system, e.g., when the MS 102C is turned on or when the MS 102C transitions between two systems, e.g., two MSCs. In addition, the MS 102C is authenticated when originating a call on the cellular network. It is envisioned that the authentication procedure can also be implemented at other times. The MS 102 begins the authentication procedure by generating 402 a shared secret data (SSD) signal using the CAVE algorithm in the encryption unit 218. The MS 102 receives an authentication key (A-Key) and a RANDSSD signal from the authentication data unit 222, and the ESN signal from the mobile station identification unit 210 and generates the SSD signal which is stored in the authentication data unit 222. The MS 102 generates the random number (RAND) signal by combining an authentication counter (A-count) stored in the counter unit 216 with an auxiliary key (KA) that is stored in the authentication data unit 222. The RAND generation unit 214 combines the A-count signal and the KA signal to generate a RAND signal. Two combining techniques that can be implemented by the RAND generation unit 214 include concatenating the A-count signal and the KA and interleaving the values of these signals. The Encryption unit 218 receives the SSD signal, the MIN signal, the ESN signal, and the RAND signal and generates 404 an authentication result signal (AUTHR) using an encryption algorithm, e.g., the CAVE algorithm.

The feature code string generation unit 220 of the MS 102 then generates 406 a feature code sting signal. In the preferred embodiment the feature code string is a 16 digit sequence. In alternate embodiments, a different feature code string size is used, e.g., 32 digits. The feature code string signal of the preferred embodiment includes a 3 digit special authentication feature code, e.g., "*99". The first digit of the feature code is a "feature" symbol, i.e., "*". The second-and third digits of the feature code are selected such that all BSs 104 and all MSCs 106 do not attempt to interpret: or perform any functions in response thereto except to package the feature code string into a signal and transmit the feature code string signal to the HLR/AC in the home system. Instead, the value of the first three digits of the feature code string signal ensures that the BS 104 and the MSC 106 forward the entire feature code string to the HLR/AC 302. The feature code string format used in the preferred embodiment is compatible with the existing AMPS signaling standard. The remaining 13 digits of the feature code string signal include a 2 digit indication of the signal type, e.g., a registration signal or a call origination signal, the 5 digit counter (A-count), and the 6 digit authentication result signal (AUTHR). In alternate embodiments, the feature code string can include different representations, e.g., instead of the counter the value of the RAND signal can be included since the counter can be determined from the RAND value; a 4 or 5 digit feature code could be used, or a larger authentication result signal could be used, for example.

The MS 102 increments 408 the value of the counter for every feature code string signal transmission. The MS 102C automatically transmits 410 the feature code string to the MSC/VLR 106A via a BS 104B. As described above, the MSC/VLR 106A interprets the first 3 digits of the feature code string such that the MSC/VLR 106A bundles the entire 16 bit feature code string into a feature message and transmits 412 the feature message to the HLR/AC 302. The HLR/AC 302 receives the feature message and performs two general tasks to determine if the received signal is authentic. First, the HLR/AC 302 recalculates the authentication result AUTHR and, second, the HLR/AC 302 compares the value of the counter value received in the feature code string signal with an internal counter value, stored and updated locally in the HLR/AC 302, to determine if the received counter value signal is valid. One technique for implementing the HLR/AC 302 portion of the authentication technique is now described.

The HLR/AC counter unit 310 stores a counter signal that is identified with the MS 102C. The incrementing procedure used by the HLR/AC counter unit 310 and the MS counter unit 216 is the same, e.g., the counter is incremented by one for every authentication request transmitted (for the MS) or received (for the HLR/AC counter unit 310). Occasionally, the MS 102C can make an authentication request by generating and transmitting a feature code string, as described above, but because of an error in the cellular network, for example, the authentication request signal is not received by the HLR/AC 302. Accordingly, in this situation, the MS 102 has incremented its counter because the MS 102C has transmitted the authentication request signal but the HLR/AC counter unit 310 has not incremented its counter because the HLR/AC 302 did not receive the authentication request signal. In order to compensate for this incongruity, the HLR/AC counter validation unit 312 determines 414 if the received counter is valid by comparing the received counter with the counter value stored in the HLR/AC counter unit 310. In the preferred embodiment, an exact match is riot necessary, instead the received counter signal is valid if: (1) the value of the received counter signal is not less than the counter value stored in the HLR/AC counter unit 310, and (2) the value of the received counter signal is within a defined range of the counter value stored in the HLR/AC counter unit 310, e.g., a range of ten. The present invention requires that the received counter have a value that is not less than the stored counter value to ensure that a previous authentication signal transmitted by the MS 102C through the air and that is intercepted will not be successfully authenticated if re-transmitted. As described above, the counter signal represents a 5 digit value.

It is highly unlikely that the value of the counter will transition from 99999 to 00000. For example, if the MS is frequently used it could still be approximately ten years before this transition occurs. However, in this unlikely event, or due to a problem with the counter such that it must be reset, the preferred embodiment of the present invention solves this problem by initiating a MS reset procedure. The user of the MS 102 is informed by a network operator agent that a MS reset procedure is required and the user is instructed to enter a special function code on the MS 102. This initiates a procedure whereby the user is prompted to enter a 4 digit number provided by the network operator agent. The MS 102 retrieves the RANDSSD from the authentication data unit 222, replaces 4 digits of the stored RANDSSD with the 4 digits provided by the network operator agent and uses this number as the new RANDSSD, receives the authentication key (A-Key) from the authentication data unit 222 and the ESM signal from the mobile station identification unit 210 and generates a new SSD signal, which it stores in the authentication data unit 222. The MS 102 resets the authentication counter (A-count) stored in the counter unit 216. The same procedure is implemented in the HLR/AC 302. After implementing this procedure in the MS 102 and the HLR/AC 302 they are re-synchronized. It will be apparent to persons skilled in the art that other techniques can be used to resolve this problem.

If the counter validation unit 312 determines 414 that the received counter signal is valid, the HLR/AC counter unit 310 updates 416 the value of its counter to a value that is one more than the received counter value in order to ensure that the HLR/AC counter corresponds with the updated value of the MS counter.

If, due to software or data communications error, the MS 102 and the HLR/AC 302 lose A-Count alignment, e.g., the A-Count in the MS 102 is beyond the range of acceptability of the HLR/AC, the subscriber may not be allowed to make calls, other than emergency call, for example. This situation may trigger an automatic call from the network operator agent to the subscriber to verify the identity of the subscriber. If the verification is successful, the HLR/AC's A-Count will be reset to the last value received from the MS 102.

One feature of the present invention is that the HLR/AC 302 independently determines the value of the authentication signal. In the preferred embodiment, the MS identification data unit 324 includes signals representing the values of the A-Key, RANDSSD, and ESN for each MS 102 that subscribes to the HLR/AC 302. The HLR/AC encryption unit 320 uses these signals to generate an SSD2 value using, for example, the CAVE algorithm. If the MS 102C is authentic, the SSD2 value should be equal to the SSD value generated by the MS 102C. The HLR/AC RAND generation unit 318 receives the counter value (A-count) from the MS 102 and receives the KA value from the MS identification data unit 324. The HLR/AC RAND generation unit 318 generates 418 a RAND2 value based upon the received A-count and the KA value. The HLR/AC encryption unit 320 receives signals representing SSD2, RAND2, MIN, and ESN and implements the same encryption algorithm used in the MS 102, e.g., the CAVE algorithm, using the received signal as inputs. The encryption algorithm generates 420 a HLR/AC authentication result signal (AUTHR2). The authentication unit 316 compares the authentication result signal in the feature code string signal (AUTHR) with the HLR/AC authentication signal (AUTHR2). If AUTHR is equal to AUTHR2 422 then the MS 102 is authenticated 426. If either the AUTHR is not equal to AUTHR2 or the received counter is not valid, then the authentication unit 316 determines 422 that the MS is not authenticated 424. The authentication result is sent to the service qualification unit 322 that generates and transmits an authorization signal to the MS 102 via the cellular network. Alternatively, if the MS is not authenticated, the service qualification unit 322 can initiate monitoring of the MS's future system access event (for tracking the fraudulent MS 102, for example), direct the serving MSC/VLR 106 to delete the MS 102 from its database, or to take some other network specific action.

As described above, various techniques for determining the authentication signal can be used. One feature of the present invention is that the value of the counter and the value of the authentication signal vary with each authentication procedure. As described above, varying the authentication signal ensures that if the authentication signal is intercepted and re-transmitted that the re-transmitted signal will not be authenticated by the HLR/AC 302. The present invention transmits the authentication result and the MS counter from the MS 102C to the HLR/AC 302 either directly or in a form where these values can be determined. For example, in an alternate embodiment, the RAND value is included in the feature code string signal and the HLR/AC 302 includes a separation unit that determines the value of the counter (A-count) based upon the RAND value.

Figure 5:
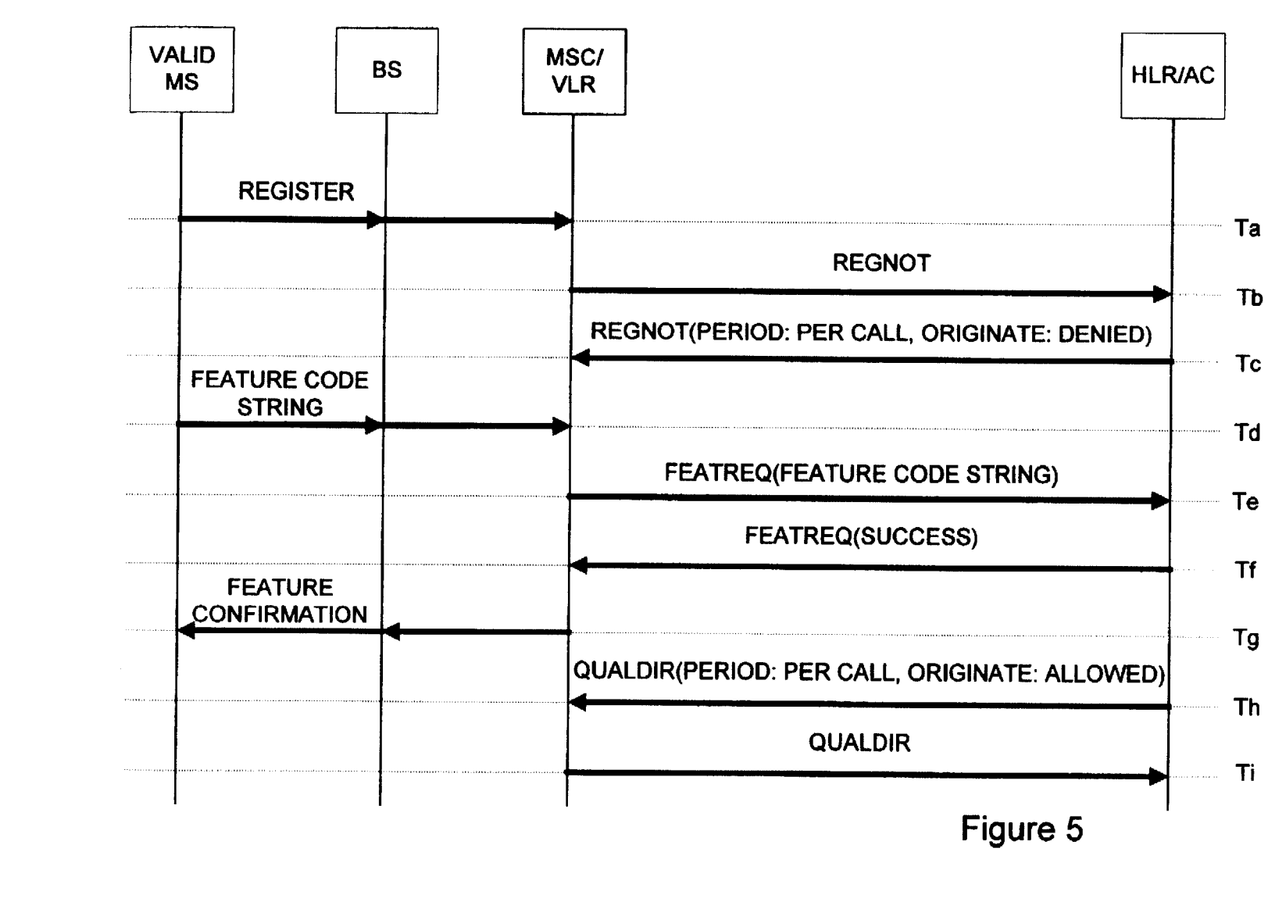
FIG. 5 is an illustration of the authentication procedure during a mobile station registration process according to the preferred embodiment of the present invention.

FIGS. 5–9 illustrate examples of the present invention. FIG. 5 is an illustration of the authentication procedure during a mobile station registration process according to the preferred embodiment of the present invention. As described above, the authentication procedure of the present invention can be invoked when a MS 102C registers on the cellular network which is initiated by, for example, turning on the MS 102C. In the preferred embodiment, the registration of a MS 102C notifies the home system, e.g., the HLR/AC 302, of the location of the MS 102C. In addition, the home system generates a signal indicating whether the MS 102C can originate or terminate a call, as described below. In FIG. 5, the timing of the registration procedure is identified as time Ta through Ti. At time Ta a valid MS 102C initiates the registration process by turning on the MS 102C, for example. A register signal is sent by the valid MS 102C to the MSC/VLR 106A via the BS 104B. The register signal includes the unique MS identifier. The MSC/VLR 106A transmits an invoke registration notification signal (a REGNOT in the IS-41 signaling protocol) to the HLR/AC 302 at time Tb. The HLR/AC 302 initiates a conventional registration sequence, e.g., the registration sequence set forth in the IS-41 signaling protocol, and if the MS is valid, the HLR/AC 302 transmits a registration notification response signal (regnot) to the MSC/VLR 106A indicating that the MS 102C is registered although the MS 102C is not yet authorized to originate a call, as indicated at time Tc by -originate: denied-, and that the MS must be authorized for every call initiation, as indicated by -period: per call-. The MS 102C is not authorized to originate a call at this point because the authentication procedure described above with reference to FIGS. 1–4 has not yet been implemented.

After a period of time, or after receiving a confirmation signal (not shown) from the MSC/VLR 106A, the valid MS 102C generates and transmits a feature code string to the MSC/VLR 106A at time Td. The procedure for generating the feature code string is set forth above. The MSC/VLR 106A detects the feature code string, e.g., based on the first three digits of the feature code string, and transmits the feature code string to the HLR/AC 302 using an invoke feature request signal (a FEATREQ signal in the IS-41 signaling protocol) at time Te. As described above, the present invention utilizes the IS-41 signaling protocol such that the present invention operates without altering conventional BSs 102 and MSC/VLRs 106. The HLR/AC 302 detects the invoke feature request and determines that the feature request is an authentication request based upon the second and third digits of the feature code, for example. The HLR/AC 302 performs the authentication procedure described above and, if authenticated, generates a feature request response signal (featreq) indicating that the MS 102C is authenticated, at time Tf. The MSC/VLR 104 transmits a feature confirmation signal to the MS 102C at time Tg. Thereafter, at time Tf, the HLR/AC 302 generates an invoke service qualification directive signal (a QUALDIR in the IS-41 signaling protocol) indicating that the MS 102 is authorized to originate calls and that the MSC/VLR 106A transmits a service qualification directive acknowledgment signal (qualdir) to the HLR/AC 302 at time Ti. It will be apparent that some implementation details can be modified without departing from the scope of the present invention. As a result of the MS 102C registration, the MS 102C is recognized and registered such that the MS 102C is authorized to originate calls, subject to another authorization when the call is actually originated, since the authorization period is "per call."

Figure 6:
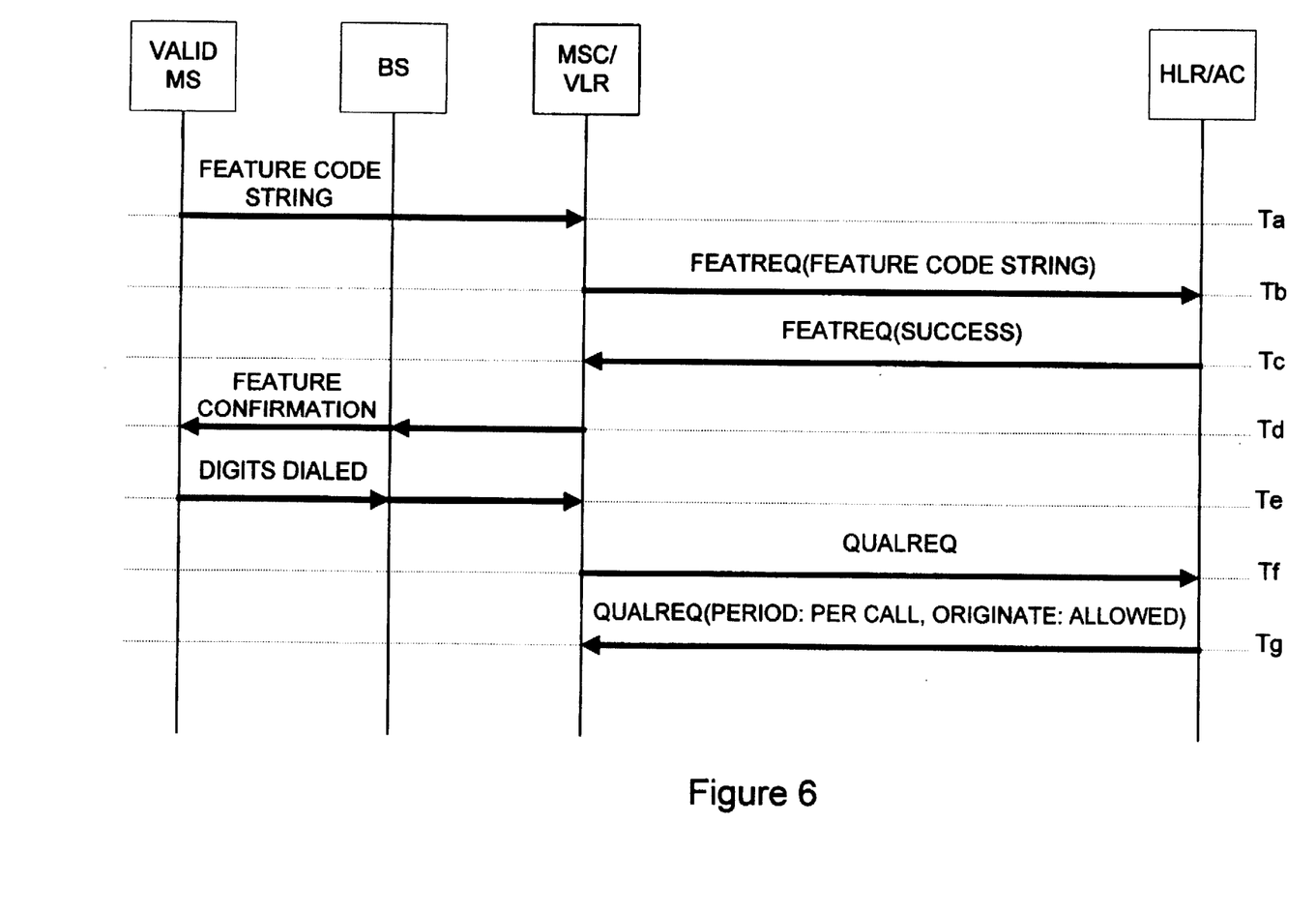
FIG. 6 is an illustration of the authentication procedure during a mobile station call origination process according to the preferred embodiment of the present invention.

FIG. 6 is an illustration of the authentication procedure during a mobile station call origination process according to the preferred embodiment of the present invention. A user of the MS 102C dials the number of a destination telephone or another MS. The system and method of the present invention attempts to authenticate the MS 102C before placing the call. The valid MS 102C generates a feature code string using the technique described above, at time Ta. An invoke feature request signal (FEATREQ) is transmitted to the HLR/AC 302 at time Tb and the HLR/AC 302 performs the authentication technique of the present invention, as described above. The HLR/AC 302 then transmits a feature request response signal (featreq) indicating that the MS 102 is authentic, at time Tc. The HLR/AC 302 also stores a signal in the MS identification data unit 324 indicating that the MS 102C is authenticated for originating a call. After a period of time, or after receiving the confirmation signal from the MSC/VLR 106A, the MS 102C originates a call by transmitting the dialed digits to the MSC/VLR 106A via the BS 104B. The MSC/VLR 106A detects the call origination and sends an invoke service qualification request signal (QUALREQ) to the HLR/AC 302 since the authorization period is "per call." In response to the QUALREQ signal the HLR/AC 302 checks the MS identification unit 324 to determine if the MS 102C is authenticated for originating a call. If the MS 102C is authenticated, then the HLR/AC 302 generates a service qualification response signal (qualreq) at time Tg indicating that the MS 102C is authorized to originate a call. The HLR/AC 302 then stores a signal in the MS identification data unit 324 indicating that the MS 102 is not authenticated for originating a call. Resetting this value ensures that the authentication procedure will be implemented for each call origination. The MSC/VLR 106A then continues setting up the call.

Figure 7:
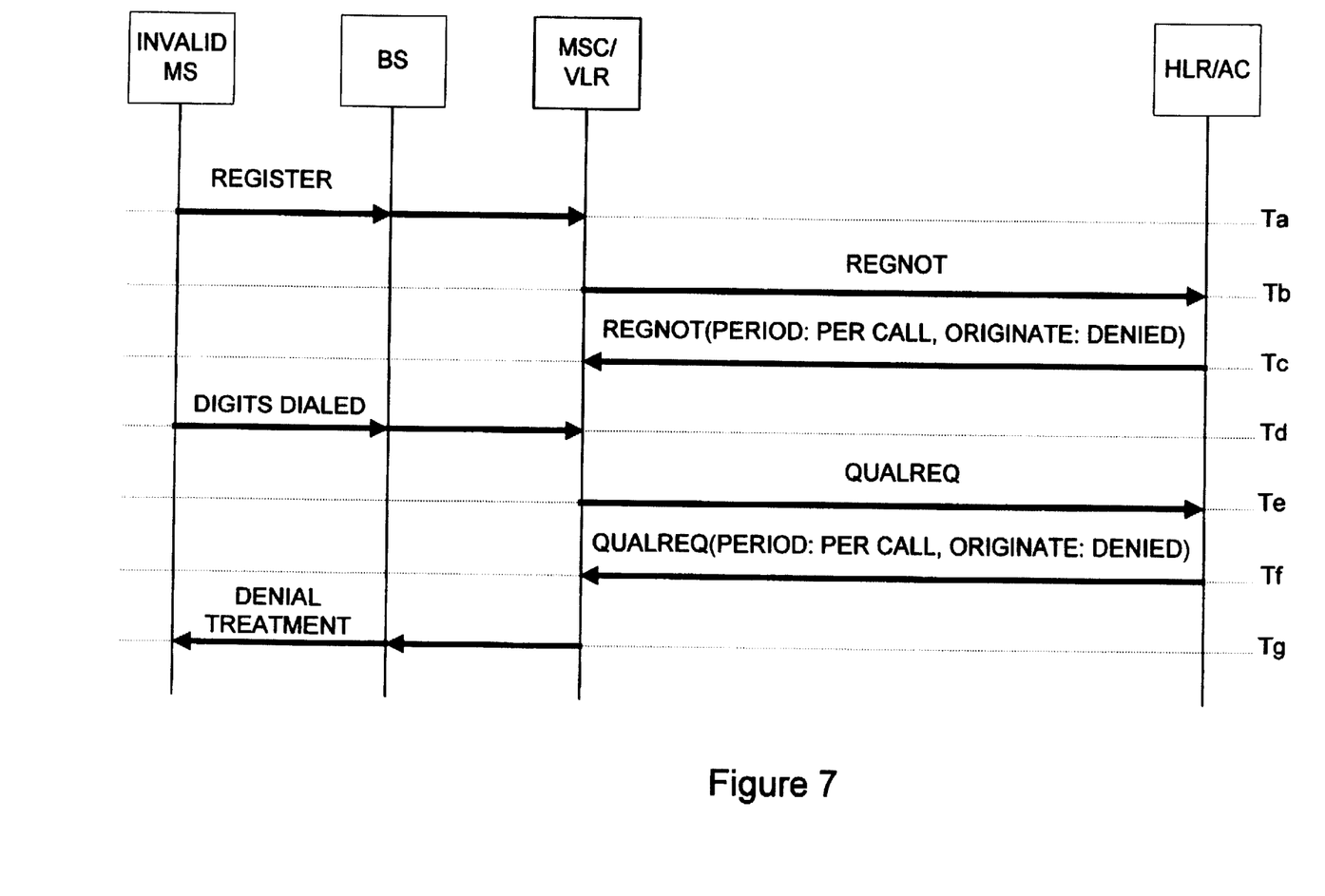
FIG. 7 is an illustration of a first example of detecting an invalid registration according to the preferred embodiment of the present invention.
Figure 8:
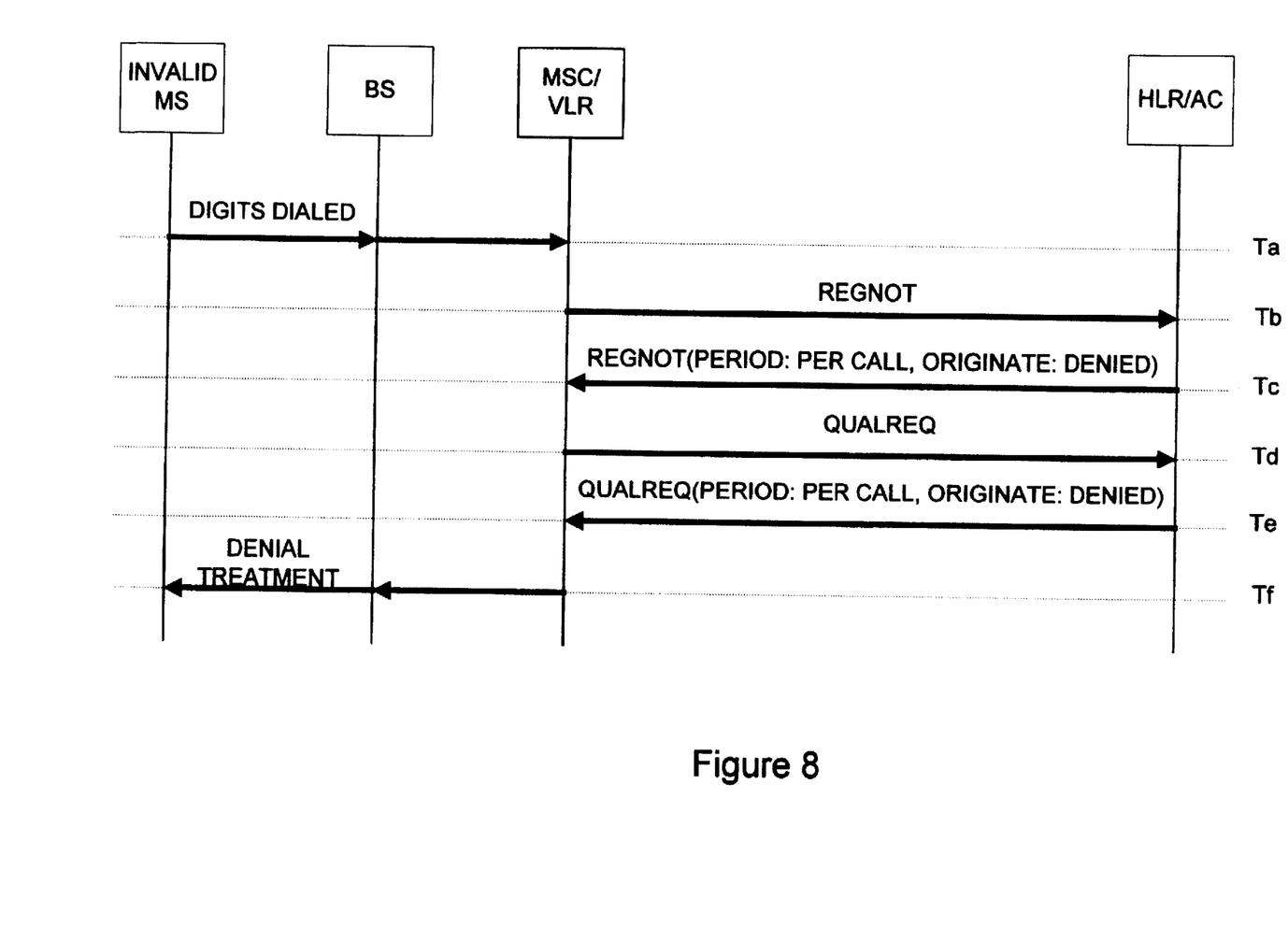
FIG. 8 is an illustration of a second example of detecting an invalid registration according to the preferred embodiment of the present invention.
Figure 9:
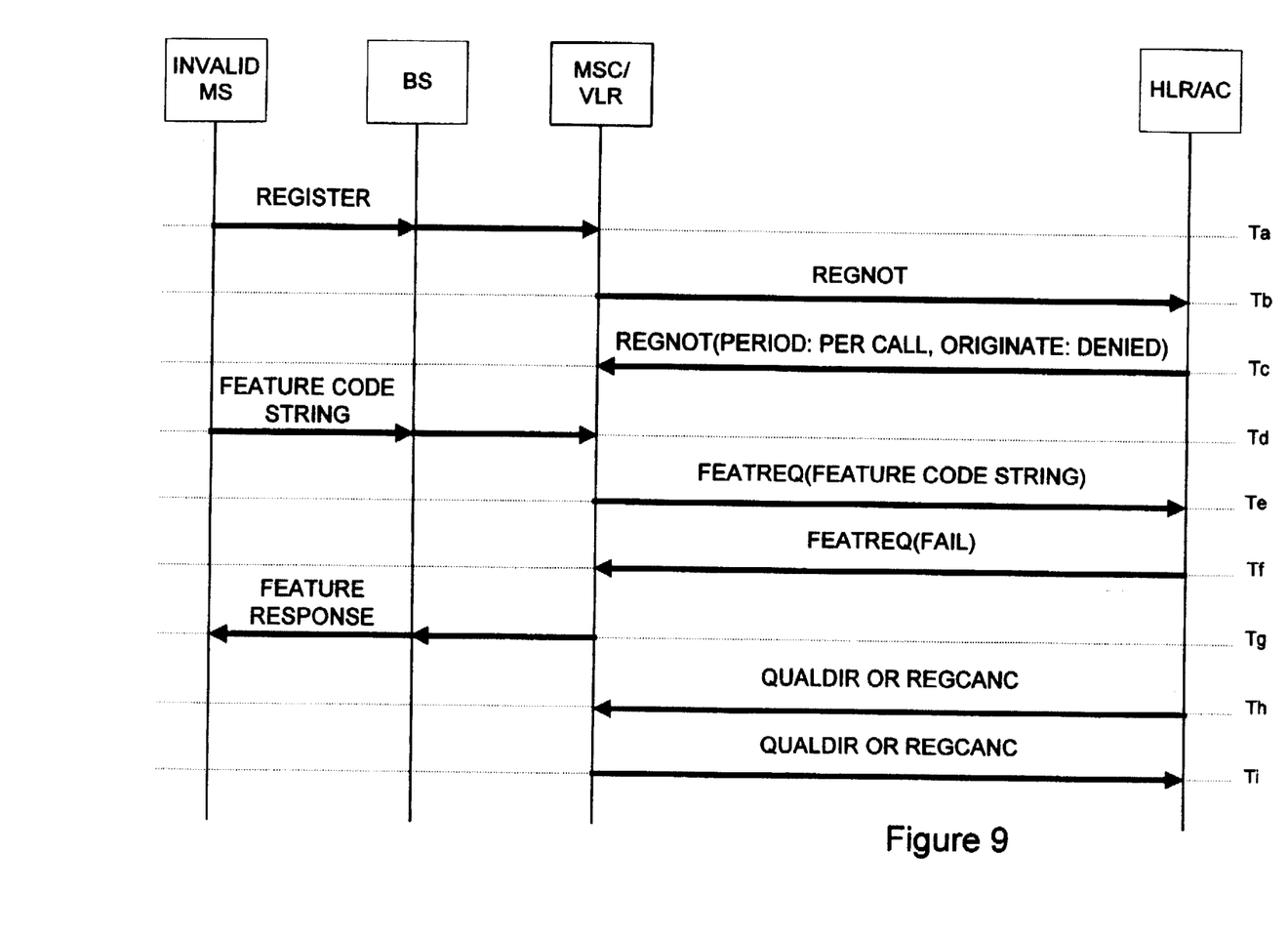
FIG. 9 is an illustration of a third example of detecting an invalid registration according to the preferred embodiment of the present invention.

FIGS. 5 and 6 illustrate the procedure for authenticating a MS 102C during MS registration and MS call origination. As described above, the authentication procedure and system of the present invention modifies the authentication signals transmitted over the air for each call and can detect when a previous authentication signal is re-transmitted by comparing the value of the counter in the MS 102C and the HLR/AC 302. FIGS. 7-9 illustrate three examples of how an invalid MS is detected by the system and method of the present invention.

FIG. 7 is an illustration of a first example of detecting an invalid registration according to the preferred embodiment of the present invention. At time Ta an invalid MS attempts to register, for example, after being turned on. The registration request is transmitted to the MSC/VLR 106A which generates a REGNOT signal at time Tb. If the registration signal includes the ESN and MIN of a valid MS, e.g., MS 102C, then the invalid MS can actually be registered. At time Tc, the HLR/AC 302 transmits a registration response signal (regnot) indicating that the authorization period is "per call" and that the invalid MS is not permitted to originate a call, since the invalid MS has not been authenticated. At time Td, the invalid MS transmits dialed digits to the MSC/VLR 106A. The MSC/VLR 106A can either automatically deny the invalid MS from placing the call because the "originate" value is currently set to "denied" or the MSC/VLR 106A can transmit an invoke service qualification request (QUALREQ) to the HLR/AC 302 at time Te. The service qualification request is denied at time Tf because the invalid MS has not been authenticated. Therefore, the invalid MS cannot originate a call.

FIG. 8 is an illustration of a second example of detecting an invalid registration according to the preferred embodiment of the present invention. In this example, the user of the invalid MS turns on the MS and immediately generates a call origination signal, i.e., the registration procedure is bypassed. The invalid MS transmits the dialed digits to the MSC/VLR 106A and transmits an invoke registration notification signal (REGNOT) to the HLR/AC 302 at time Tb. The HLR/AC 302 registers the invalid MS but indicates that it cannot: originate calls, at time Tc. In addition, the HLR/AC 302 internally identifies the invalid MS as "not yet authenticated for call origination," as described above. After time Tc, the MSC/VLR 106 can immediately treat the call origination request as invalid since the origination value is equal to "denied" or if the MSC/VLR 106 is designed to seek service qualification even when a MS 102 is barred from originating a call, then the serving system transmits an invoke service qualification request signal (QUALREQ) to the HLR/AC 302. Since the MS has not been authenticated for call origination, the authentication procedure of the present invention will determine that the MS is not authentic and will transmit such an indication, e.g., -originate: denied-, to the MSC/VLR 106A at time Te, and the invalid MS will be treated as an invalid MS, as described above.

FIG. 9 is an illustration of a third example of detecting an invalid registration according to the preferred embodiment of the present invention. At times Ta-Tc the call is registered, as described above. At time Td, the invalid MS transmits an invalid feature code string to the MSC/VLR 106A. The MSC/VLR 106A transmits an invoke feature request signal (FEATREQ) to the HLR/AC 302 at time Te. The HLR/AC 302 invokes the authentication technique of the present invention to determine that the invalid MS is not authentic. The HLR/AC transmits a failed feature request result to the MSC/VLR 106 at time Tf. Since the invalid MS is not authentic, the HLR/AC 302 can transmit a QUALDIR signal indicating that authorization was denied or an invoke registration cancellation signal (REGCANC) to delete the invalid MS from the MSC/VLR 106 database.

While the invention has been particularly shown and described with reference to a preferred embodiment, it will be understood by persons skilled in the relevant art that various change in form and details can be made therein without departing from the spirit and scope of the invention.

What is claimed is:

1. A method for authenticating a transmitting unit in a cellular network having an authentication unit and an intermediate unit, comprising the steps of:
   (1) generating a first signal representing a combination of a first random signal having a random value and a first count signal in the transmitting unit;
   (2) generating a first encrypted signal in response to a first key signal and said first signal in the transmitting unit;
   (3) transmitting a first feature signal from the transmitting unit to the authentication unit, said first feature signal including an identification signal identifying said first feature signal as an authentication signal, said first encrypted signal, and said first signal;
   (4) generating a second count signal from said first signal;
   (5) generating a second encrypted signal in response to a second key signal and said first signal in the authentication unit; and
   (6) determining that the transmitting unit is authentic if a value of said first count signal is within a first predetermined value of a value of said second count signal and said first encrypted signal is equal to said second encrypted signal in said authentication unit.

2. The method of claim 1, further comprising the steps of:
   modifying said value of said first count signal a first amount in said transmitting unit;
   modifying said value of said second count signal a second amount in said authentication unit; and
   repeating steps (1) through (6).

3. The method of claim 2, wherein said first amount is equal to said second amount.

4. The method of claim 1, wherein step (3) includes the steps of:
   receiving said first feature signal at an intermediate unit;
   identifying said first feature signal as a signal representing a request for a function to be performed by the authentication unit; and
   transmitting said first feature signal to the authentication unit.

5. The method of claim 1, wherein step (3) uses a first signaling protocol to transmit said first feature signal from the transmitting unit to the authentication unit, said first signaling protocol being one of a TIA/EIA IS-41 standard and a derivative of said TIA/EIA IS-41 standard.

6. The method of claim 5, wherein said first feature signal is transmitted from the transmitting unit to the authentication unit using a feature code activation sequence of said TIA/EIA IS-41 standard.

7. A method for authenticating a transmitting unit in a cellular network having an authentication unit and an intermediate unit, comprising the steps of:

(1) generating a first signal representing a combination of a first random signal having a random value and a first count signal in the transmitting unit;

(2) generating a first encrypted signal in response to a first key signal and said first signal in the transmitting unit;

(3) transmitting a first feature signal from the transmitting unit to the authentication unit, said first feature signal including an identification signal identifying said first feature signal as an authentication signal, said first encrypted signal, and said first count signal;

(4) generating a second signal representing a combination of a first random signal having a random value and a first count signal in the authentication unit;

(5) generating a second encrypted signal in response to a second key signal and said second signal in the authentication unit; and (6) determining that the transmitting unit is authentic if a value of said first count signal is within a first predetermined value of a value of a second count signal and said first encrypted signal is equal to said second encrypted signal, in said authentication unit.

8. The method of claim 7, further comprising the steps of:

modifying said value of said first count signal a first amount in said transmitting unit;

modifying said value of said second count signal a second amount in said authentication unit; and repeating steps (1) through (6).

9. The method of claim 8, wherein said first amount is equal to said second amount.

10. The method of claim 7, wherein step (3) uses a first signaling protocol to transmit said first feature signal from the transmitting unit to the authentication unit, said first signaling protocol being one of a TIA/EIA IS-41 standard and a derivative of said TIA/EIA IS-41 standard.

11. The method of claim 10, wherein said first feature signal is transmitted from the transmitting unit to the authentication unit using a feature code activation sequence of said TIA/EIA IS-41 standard.

12. A system for authenticating a first transmission signal, the system comprising:

a transmitting unit, for transmitting an authentication signal, said transmitting unit including:

a counter unit, for storing a first count signal, a value of said first count signal is modified for every transmission of said transmitting unit;

a random signal generator for generating a first signal representing a combination of a first random signal having a random value and a first count signal;

an encrypted signal generator, coupled to said random signal generator, for generating a first encrypted signal in response to a first key signal and said first signal in the transmitting unit;

an authentication signal generator, coupled to said encrypted signal generator, for generating a first feature signal, said first feature signal including an identification signal identifying said first feature signal as an authentication signal, said first encrypted signal, and said first signal;

an authentication unit, disposed to receive said first feature signal, for authenticating said first feature signal, including:

a second encrypted signal generator, for generating a second encrypted signal in response to a second key signal and said first signal; and an authentication unit, coupled to said second encrypted signal generator, for identifying said first feature signal as authentic if a value of said first count signal is within a first predetermined value of a value of said second count signal and said first encrypted signal is equal to said second encrypted signal.

13. The system of claim 12, further comprising:

an intermediate unit, for receiving said first feature signal and for transmitting said first feature signal to said authentication unit using a first standard protocol to transmit said first feature signal.

14. The system of claim 13, wherein said first standard protocol is one of a TIA/EIA IS-41 standard and a derivative of said TIA/EIA IS-41 standard.

15. The method of claim 14, wherein said intermediate unit transmits said first feature signal using a feature code activation sequence of said TIA/EIA IS-41 standard.

16. The method of claim 15, wherein said transmitting unit transmits said first feature signal using a feature code activation sequence of said TIA/EIA IS-41 standard.

* * * * *